US012618501B2

(12) United States Patent
Weih et al.

(10) Patent No.: US 12,618,501 B2
(45) Date of Patent: May 5, 2026

(54) SPLINE LOCK RESTRAINED PIPE JOINING SYSTEM FOR PLASTIC PIPE

(71) Applicant: S&B Technical Products, Inc., Fort Worth, TX (US)

(72) Inventors: Mark A. Weih, San Jose (CR); Guido Quesada, Santa Ana (CR)

(73) Assignee: S&B Technical Products, Inc., Fort Worth, TX (US)

( * ) Notice: Subject to any disclaimer, the term of this patent is extended or adjusted under 35 U.S.C. 154(b) by 39 days.

(21) Appl. No.: 18/641,943

(22) Filed: Apr. 22, 2024

(65) Prior Publication Data

US 2024/0369166 A1 Nov. 7, 2024

Related U.S. Application Data

(60) Provisional application No. 63/499,574, filed on May 2, 2023.

(51) Int. Cl.
*F16L 37/14* (2006.01)
*E21B 17/046* (2006.01)

(52) U.S. Cl.
CPC .......... *F16L 37/148* (2013.01); *E21B 17/046* (2013.01)

(58) Field of Classification Search
CPC . F16L 47/08; F16L 47/10; F16L 47/12; F16L 21/03; F16L 37/148
See application file for complete search history.

(56) References Cited

U.S. PATENT DOCUMENTS

| | | | |
|---|---|---|---|
| 3,606,402 A | 9/1971 | Medney | |
| 5,255,945 A | 10/1993 | Toon | |
| 6,325,424 B1 | 12/2001 | Metcalf et al. | |
| 6,352,288 B1 | 3/2002 | Calkins | |
| 7,845,686 B2 | 12/2010 | Steinbruck | |
| 8,444,186 B2 * | 5/2013 | Jones | F16L 37/0925 |
| 2016/0245435 A1 * | 8/2016 | Corbett, Jr. | F16L 47/12 |
| 2016/0356411 A1 | 12/2016 | Clapper et al. | |
| 2021/0215287 A1 * | 7/2021 | Wells | F16L 47/12 |
| 2021/0278025 A1 | 9/2021 | Wells et al. | |

FOREIGN PATENT DOCUMENTS

| | | |
|---|---|---|
| WO | 99/40355 A1 | 8/1999 |

OTHER PUBLICATIONS

International Search Report issued for PCT/US2024/025808; dated Jul. 15, 2024; 2 pages.
Written Opinion issued for PCT/US2024/025808; dated Jul. 15, 2024; 7 pages.

* cited by examiner

*Primary Examiner* — Zachary T Dragicevich

(74) *Attorney, Agent, or Firm* — Whitaker Chalk Swindle & Schwartz PLLC; J. Miguel Hernandez; Charles D. Gunter, Jr.

(57) ABSTRACT

A restrained pipe joining system for plastic pipe is shown comprising male and female ends each having aligned circumferential grooves which form a canal for passage of a locking keystrap. The keystrap can be formed of PEEK or PEEK reinforced with glass fiber. During manufacture, the female belled end is sequentially formed over a Rieber style gasket and then over a ring-shaped casing member. The casing member is also formed from polymeric composite materials. In some cases, the casing is reinforced with an internal metal band.

9 Claims, 9 Drawing Sheets

SPLINE LOCK RESTRAINED PIPE JOINING SYSTEM FOR PLASTIC PIPE

1. CROSS-REFERENCE TO RELATED APPLICATIONS

The present application claims priority from an earlier filed provisional application, Ser. No. 63/499,574, filed May 2, 2023, entitled "Spline Lock Restrained Pipe Joining System for Plastic Pipe", by the same inventors.

BACKGROUND OF THE INVENTION

2. Field of the Invention

The present invention relates generally to a restrained joint for coupling plastic pipe and, more specifically to such a restrained joint which utilizes a spline or keystrap to connect a male spigot pipe end to a mating female belled pipe end.

3. Description of the Prior Art

A variety of piping systems are known for the conveyance of fluids which employ elastomeric type sealing rings or gaskets. The pipes used in such systems may be formed of PVC, polyolefins such as PE and PP, ductile iron, concrete, clay, fiberglass, steel, cast iron, fiberglass/cement reinforced pipes and such metals as aluminum and copper. At the present time, pipes formed of thermoplastic materials, including PVC and polyethylene, are preferred for use in pipeline installations for below ground pressure piping such as might be encountered in municipal water systems as well as for low pressure or non-pressure pipelines such as those carrying sewage.

In forming a joint between thermoplastic sections of pipe of this general type, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the seal capacity for the joint. In many situations, it is also desirable to provide a "restrained joint" to insure the spigot or male pipe end and the female or socket end do not separate due to hydraulic forces that exist inside the pipeline, or due to other causes, such as ground movement and the like.

The need to restrain lengths of pipe coupled together in this general fashion exists not only with respect to municipal water lines, but in other diverse applications including well casings, directional drilling applications, laying of fiber optic cable, and above ground pressure piping applications. Over time, various solutions have been proposed for providing the needed restraining function for such applications.

In each of the above described example conduit and pipeline applications, it is desirable that the joint be air and water tight. For example, when pulling fiber optic cable through a conduit, it is a common practice to use air pressure to first blow a fine fish-string through the pipeline. Also, where electrical wire or fiber optic cable is located inside the pipeline, the pipeline joints need to prevent infiltration of ground water. In similar fashion, well casing applications need to prevent infiltration of percolated surface water that potentially contains contaminants. Municipal water and sewer lines must also remain water-tight for most usable applications. The "restrained joint" helps to maintain the sealing integrity of the coupled lengths of pipe in such pipelines.

In the area of well casings and directional drilling applications using PVC pipe, one approach has been to use axially aligned circumferential grooves machined into the mouth region of the belled pipe end and into the exterior surface of the mating male, spigot pipe end. A port is drilled through the female bell to complete a circumferentially shaped, canal type passageway for receiving a locking key strap which is subsequently passed through the bell wall, into the canal of the aligned grooves, and around the circumferential passageway.

A number of different variations of this general concept are known in the marketplace at the present time. For example, U.S. Pat. No. 6,086,279 describes the equipment used in a manufacturing process for machining grooves into the inside surface of the female bell member of a plastic pipe coupling. U.S. Pat. No. 6,352,288 shows another mechanical pipe connection that includes the feature of coupler recesses with cooperating locking grooves on the pipes. Other patents representative of the general state of the prior art describe various purported improvements to these basic concepts, while sharing the common element of machining one or more grooves into the inner mouth region of the belled pipe end.

U.S. Pat. No. 7,845,686, assigned to the assignee of the present invention, describes a cooperating casing member and sealing member individually placed on a Rieber bellling mandrel. The patent cites advantages of this arrangement, for example, different seal designs can be placed in cooperation with the same casing design. The male and female pipe ends used in the system each have aligned circumferential grooves which form a canal for passage of a locking key strap. During manufacture, the female belled end is sequentially formed over a Rieber style gasket and then over a ring-shaped casing member having an inner circumferential groove formed on its inner circumferential surface.

Despite the various advances which have been made in the above described technologies, a need continues to exist for an improved spline-type restrained joining system for joining two sections of plastic pipe which joints can withstand anticipated forces likely to be encountered in use.

For example, newer materials offer advantages of increased tensile strengths and other desirable attributes that were not achievable with traditional Nylon and PVC type pipe materials and joining component materials.

A need also exists for such a pipe joining system which is economical to implement so that it does not greatly increase the cost of manufacture of the piping system.

A need also exists for such a joining system which is comprised of a casing element and sealing element which can be mounted on a forming mandrel and which can be belled over in a Rieber style manufacturing operation.

A need exists for a joining system for restrained joint which can meet the needs of such diverse plastic pipe conduit or pipeline applications as above ground temporary water lines, municipal water lines, well casing applications and horizontal drilling applications.

SUMMARY OF THE INVENTION

Figure 1:
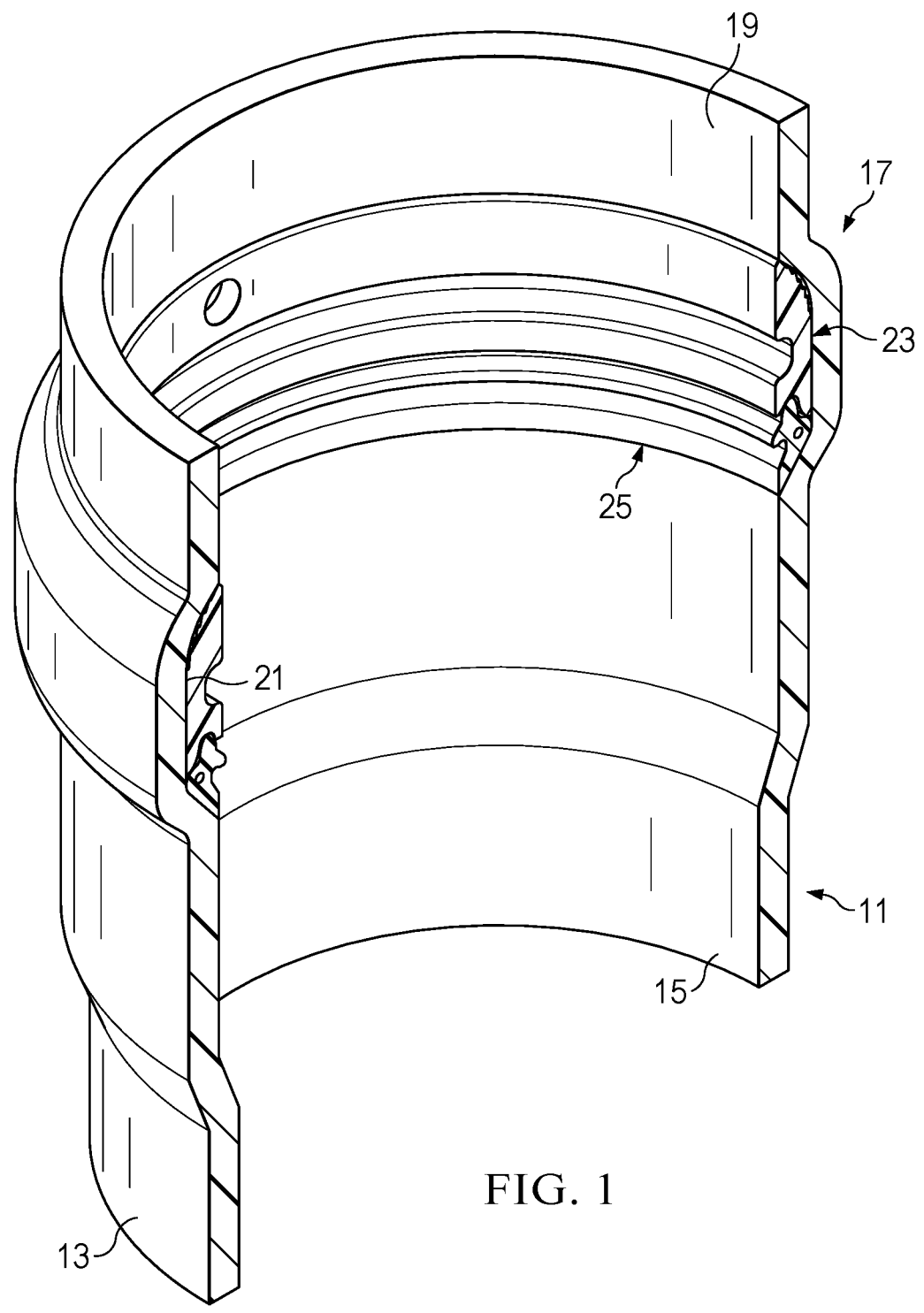
FIG. 1 is a partial perspective view of the female belled pipe end having an internal raceway, with the ring shaped casing and adjacent elastomeric gasket of the invention installed in the raceway, and showing the entrance hole for the mating keystrap used in the restraint system of the invention.

The present invention is an improved joining system for joining two sections of plastic pipe. The pipe may be straight run piping, or may be a coupling or other connection such as an elbow or tee. In the joining system of the invention, a first section of plastic pipe has a female, belled pipe end with an end opening. The belled pipe end has an exterior surface, an interior surface and a circumferential recess formed in the belled pipe end adjacent the end opening on the interior surface thereof. At least one bore communicates the exterior surface of the belled pipe end with the interior recess thereof.

A second section of plastic pipe has a mating male plastic pipe end having an interior surface and exterior surface. The exterior surface has at least one groove formed at one circumferential location thereof which is alignable with the interior recess formed in the belled pipe end when the male pipe end is inserted within the mouth opening of the belled pipe end to form a joint.

A ring shaped casing element is installed within the circumferential recess provided in the belled end of the first section of plastic pipe. The casing element has an inner circumferential surface and an outer circumferential surface and has at least one groove formed at one inner circumferential location on the inner circumferential surface thereof. At least one bore extends from the outer circumferential surface to the groove which is provided on the inner circumferential surface thereof. The bore of the casing element aligns with the bore in the belled end of the first section of plastic pipe whereby the bores, in combination with the aligned recess and groove, form a canal passageway for receiving a flexible keystrap inserted at least partly therethrough.

The casing element is preferably used in association with a companion sealing element. The sealing element also has an inner circumferential region and an outer circumferential region and is held within the belled end of the female plastic pipe such that the outer circumferential region forms a seal with the interior surface of the belled end and the inner circumferential region forms a sealing surface for the exterior surface of the mating male pipe section. Preferably, the sealing element is an elastomeric sealing gasket. Most preferably, the sealing element which is used is a Rieber style sealing gasket. The casing element and sealing element can conveniently be installed on a Rieber belling mandrel and belled over in a plastic pipe bell manufacturing operation.

In the joining system of the invention, the keystrap and casing are formed using a newer class of synthetic polymeric type materials rather than the traditional materials used in the past. Instead of using Nylon, the preferred materials for the keystrap are PEEK and PEEK reinforced with glass fiber. For example, PEEK with 10 to 30% by weight glass fiber. Instead of using metal for the casing element, the element is preferably formed of a synthetic polymeric material, such as PEEK, PEEK reinforced with glass fiber and with a steel insert, PP with up to, for example 60% glass fiber, and with a steel insert, PET with for example 15 to 30% glass fiber and with a steel insert, and PBT with for example 15 to 30% by weight glass fiber and with a steel insert.

The use of a new class of materials for the keystrap and casing element have resulted in unexpectedly improved tensile strengths and pull-out numbers for pipe joints made with these 14 newer class of materials when the tensile strengths are kept within a desired range.

The Rieber belling process which is used to install the casing element and companion sealing ring is described in U.S. Pat. No. 4,120,151 to Gunnar Parman, and similar references. The sealing ring and casing element are placed on a mandrel of a belling machine and a heated and softened pipe end is pushed up and over the trailing end of the sealing element continuing past the casing element. The pipe end is allowed to cool and the mandrel retracted leaving the sealing ring and casing situated inside the female bell end. A hole is drilled though the bell wall and through the casing wall to provide a port for the locking key strap and to communicate with the canal passageway. This type of manufacturing process for the joining system of the invention results in highly efficient production, as well as improved precision of the ultimate joint dimensions, both axially and concentrically.

Additional objects, features and advantages will be apparent in the written description which follows.

DETAILED DESCRIPTION OF THE INVENTION

The present invention provides a product and process which meet the foregoing described objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

In a first aspect, the present invention deals with a plastic pipe manufacturing technique which produces an integrally formed recess in a female, belled pipe end which recess receives a casing element and a sealing element. The casing element has a groove formed on the inner circumference thereof which is aligned with a circumferential groove which is machined on the outside, outwardly facing surface of a mating male spigot pipe end. A bore is drilled through the female bell end and through the casing element and forms a canal type passageway when the bores and grooves in the casing element and mating spigot pipe end are all aligned. A locking spline or keystrap can be inserted through the bore drilled in the female belled pipe end and into the canal of the aligned grooves and be passed around the circumference of the pipe to form a secure joint.

While such manufacturing techniques have been used to form various pipe joining systems in the past, the present invention deals with improvements in materials and methods used in such systems, which materials and methods result in unexpectedly improved tensile strengths and pull out resistance, as well as other advantages, in pipe joints using these systems. Where previous pipe joints lasted less than 1000 cycles in testing, the joining systems of the invention have lasted 25,000 to 35,000 cycles and more. This is a surprising result. In effect, the result is to drive the failure mode away from the spline and casings used in the past out to the pipe itself by using a PEEK spline, a polymer glass filled casing and, if more is necessary, a steel insert inside the polymer casing or inside a glass filed polymer casing. As a result, system failure is pushed out totally to the pipe, instead of the joining system. These concepts will be explained more fully in the discussion which follows.

The following materials may be used in the practice of the invention:

PEEK: Polyether ether ketone (PEEK) is a colourless organic thermoplastic polymer in the polyaryletherketone (PAEK) family, used in engineering applications. PEEK is a semicrystalline thermoplastic with excellent mechanical and chemical resistance properties that are retained to high temperatures. The processing conditions used to mold PEEK can influence the crystallinity, and hence the mechanical properties. The Young's modulus is 3.6 GPa and its tensile strength 90 to 100 MPa. PEEK has a glass transition temperature of around 143° C. (289° F.) and melts around 343° C. (662° F.). Some grades have a useful operating temperature of up to 250° C. (482° F.). It is highly resistant to thermal degradation as well as attack by both organic and aqueous environments. It is attacked by halogens and strong acids as well as some halogenated compounds and aliphatic hydrocarbons at high temperatures. It dissolves completely in concentrated sulfuric acid at room temperature. Because of its robustness, PEEK is used to fabricate items used in demanding applications, including bearings, piston parts, pumps, HPLC columns, compressor plate valves, and cable insulation. It is one of the few plastics compatible with ultra-high vacuum applications. It is extensively used in the aerospace, automotive, and chemical process industries.

PET: Polyethylene terephthalate, is the most common thermoplastic polymer resin of the polyester family and is used in fibers for clothing, containers for liquids and foods, and thermoforming for manufacturing, and in combination with glass fiber for engineering resins. (Wikipedia).

Melting point: 500° F. (260° C.)

Formula: $(C_{10}H_8O_4)$ n

Density: 1.38 g/cm$^3$

Molar mass: 10-50 kg/mol, varies

Abbreviations: PET, PETE

Thermal conductivity: 0.15 to 0.24 W/(m·K)

PP: Polypropylene, also known as polypropene, is a thermoplastic polymer used in a wide variety of applications. It is produced via chain-growth polymerization from the monomer propylene. Polypropylene belongs to the group of polyolefins and is partially crystalline and non-polar. (Wikipedia).

Melting point: 320° F. (160° C.)

IUPAC ID: poly (propene)

Formula: $(C_3H_6)$ n

Classification: Polymer

Density: 0.855 g/cm$^3$, amorphous; 0.946 g/cm$^3$, crystalline

Strength: around 4,800 psi ugplast-inc.com

While the following discussion uses the example of two "pipe sections" being joined in a straight run of pipeline or conduit, it will be understood that the principles of the invention can also be used to form a restrained joint in a pipe coupling, fitting, or related application.

FIG. 1 is a quarter sectional view of a first section of plastic pipe 11, typically formed of PVC, having an exterior surface 13, an interior surface 15, and having a female belled pipe end 17. The belled pipe end 17 has a mouth opening 19 has a circumferential recess 21 integrally formed therein adjacent the mouth opening 19. The circumferential recess 21 houses the ring-shaped casing member 23 and a companion sealing element 25 used in the joining system of the invention.

Figure 2:
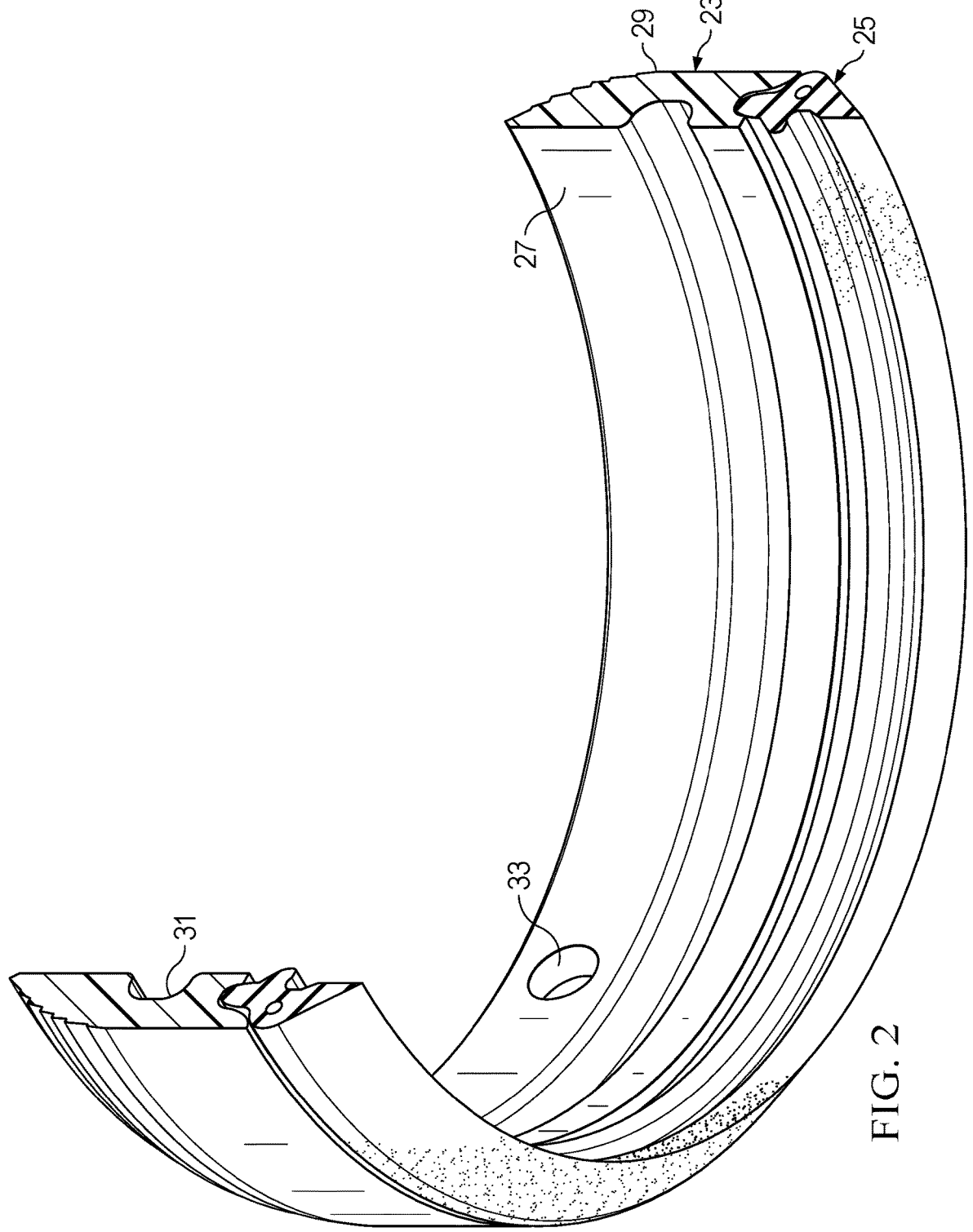
FIG. 2 is a cut away view of the isolated casing and sealing gasket used in the practice of the invention.
Figure 3:
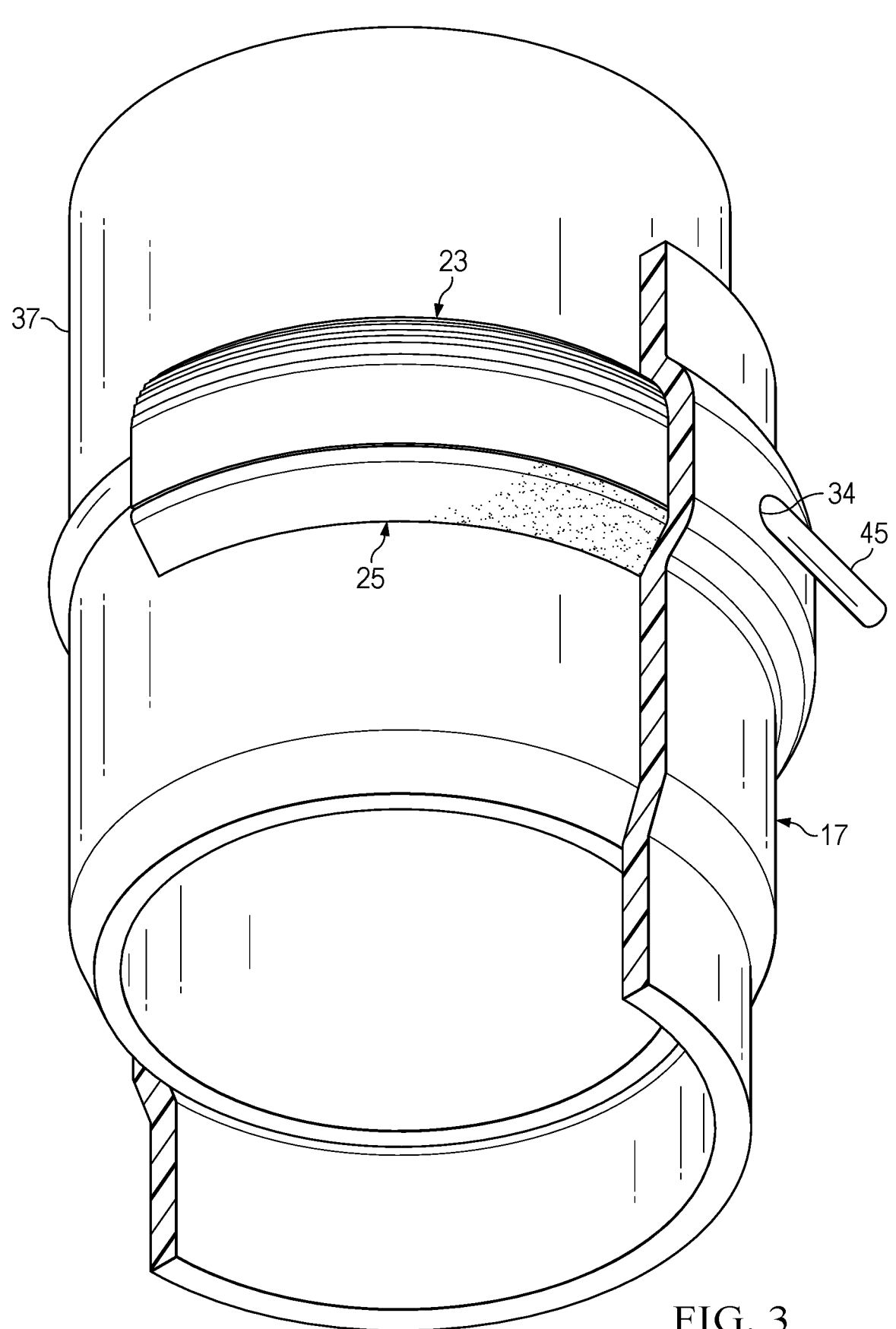
FIG. 3 is a partial perspective view of a restrained joint of the invention, partly broken away for ease of illustration, and showing the insertion of the locking keystrap into the aligned bores and grooves which make up the canal passageway used to join the two pipes.

As shown in isolated fashion in FIG. 2, the ring-shaped casing member 23 has an inner circumferential surface 27 and an outer circumferential surface 29 and has at least one circumferential groove 31 formed at one inner circumferential location on the inner circumferential surface thereof. At least one bore 33 extends from the outer circumferential surface to the groove 31. As can be seen in FIG. 3, the female, belled pipe end 17 also has a bore 34 drilled therein which communicates the exterior of the belled end with the circumferential recess 21. It will be appreciated that the bore 33 in the casing member 23 can be aligned with the bore 34 in the belled pipe end. In practice, initially there is no bore on the casing or the socket. The bore is drilled after the completion of the pipe belling process. Therefore, the casing element doesn't need to be positioned to align the respective bores.

Figure 7:
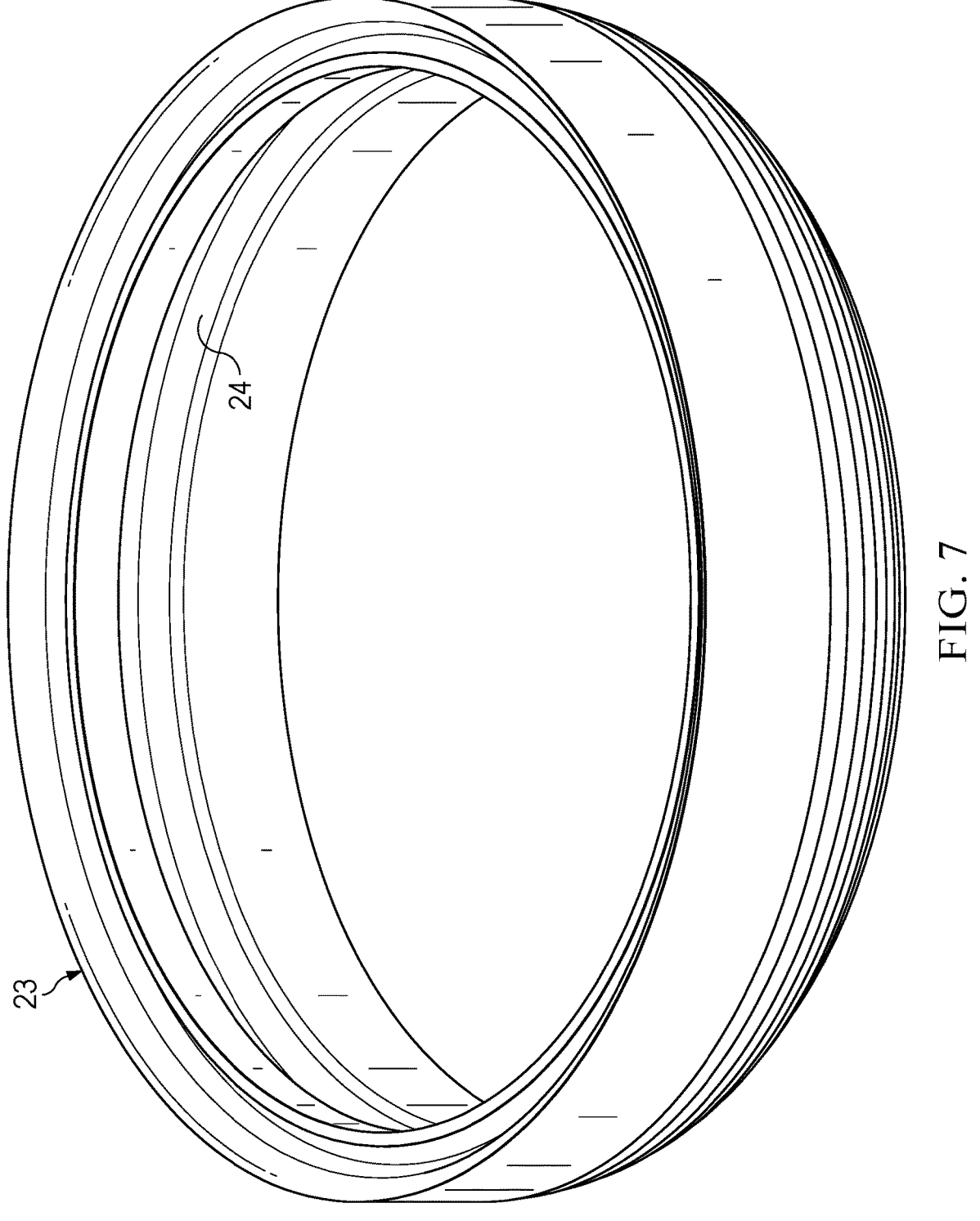
FIG. 7 is an isolated view of a casing of the invention which is lined with a metal insert ring.

The material used to make the ring-shaped casing has typically been a plastic such as PVC, or a metal, such as stainless steel, in the prior art joining systems. In the systems of the invention, the casing 23 is preferably made of a particular type of synthetic polymeric material, selected from the group consisting of PEEK, PP or PET, including these polymeric materials which have been reinforced by glass fiber, for example, 15 to 30%, or more, glass fiber by weight. The casing polymeric materials can conveniently be injection molded into blanks and machined into the desired shapes for the final casing member 23. Also, as shown in FIG. 7, the casing 23 can have an internal metal reinforcing band or liner 24 received on the internal circumference thereof. The band could be formed, for example of stainless steel, which is pre-formed and cut to the desired length and shape and then allowed to snap into place within the interior of the casing member. The particular materials can be chosen depending upon the desired restraining performance, but will generally have a modulus and tensile strength equal or greater than that of rigid PVC in the preferred embodiment (7,000 psi and 400,000 psi respectively).

The ring-shaped companion sealing element 25 (FIG. 1) is preferably an elastomer, as in known in the prior art. For example, the elastomeric gasket 25 can be formed of a natural or synthetic rubber or blends thereof, including, SBR. A natural or synthetic rubber having a hardness on the order of 50 durometer has been found to provide an acceptable degree of deformability of the seal.

Figure 8:
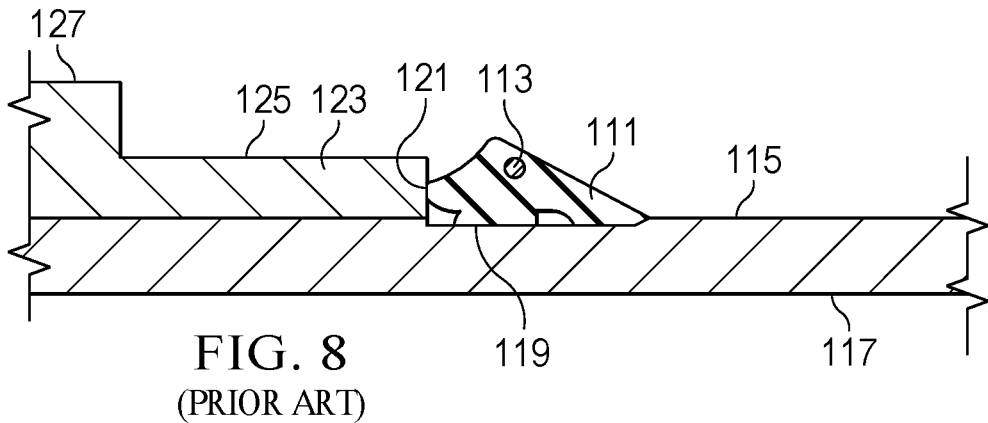
FIGS. 8-11 are simplified views of the steps involved in the prior art Rieber pipe belling process.

The ring-shaped casing member 23 and companion sealing element 25 are preferably integrated with the female belled end during the manufacturing process, as by using the known Rieber belling process which will be familiar to those skilled in the relevant industry. In the early 1970's, a neew technology was developed by Gunnar Parmann of Rieber & Sons of Bergen, Norway, which is now referred to in the industry as the "Rieber Joint." In manufacturing a Rieber Joint, the two members are placed on a mandrel of a belling machine and the heated and softened female pipe end is pushed up and over each of the joining system components. The pipe end is allowed to cool and the mandrel retracted leaving the ring shaped casing and elastomeric sealing gasket situated inside the female bell end. A hole is then drilled though the bell wall and through the casing wall to provide a port for the locking keystrap and to communicate with the canal passageway. In order to further explain the basic steps in a typical Rieber style belling operation, reference will briefly be had to FIGS. 8-11 of the Drawings which provide a simplified illustration of the prior art process. FIG. 8 shows a section of a conventional elastomeric sealing gasket 111 having a steel reinforcing ring 113 in place on the generally cylindrical outer working surface 115 of the mandrel 117 used in the belling process. As briefly mentioned, the elastomeric gasket 111 can be formed of, for example, natural or synthetic rubber or blends thereof including SBR, and is a ring-shaped, circumferential member having an inner compression surface 119 and an exposed nose portion 121 which, as shown in FIG. 8, abuts a forming collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 9.

In the first step of the prior art process, the steel reinforced elastomeric ring 111 is thus placed onto the working surface of the mandrel 117 and pushed to a position against the back-up or forming collar 123. In this position, the gasket is firmly anchored to the mandrel surface with the rubber between the mandrel and the steel-ring of the gasket being compressed by approximately 20%.

Figure 9:
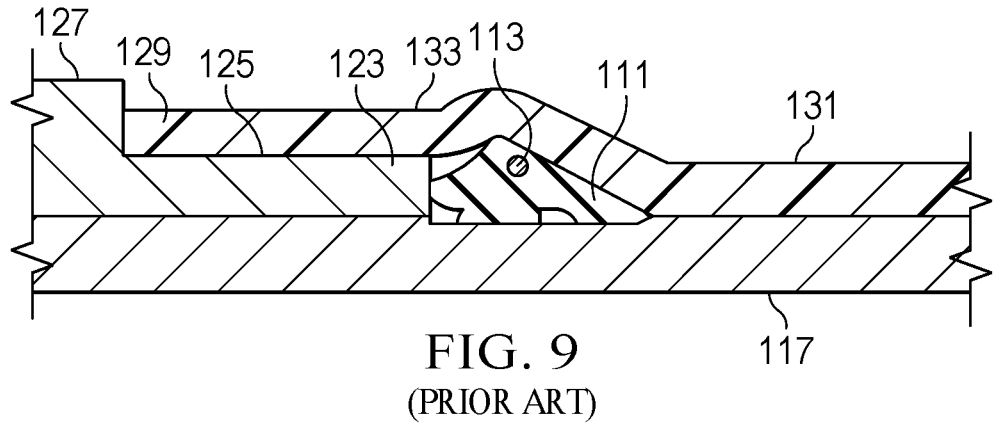
Figure 10:
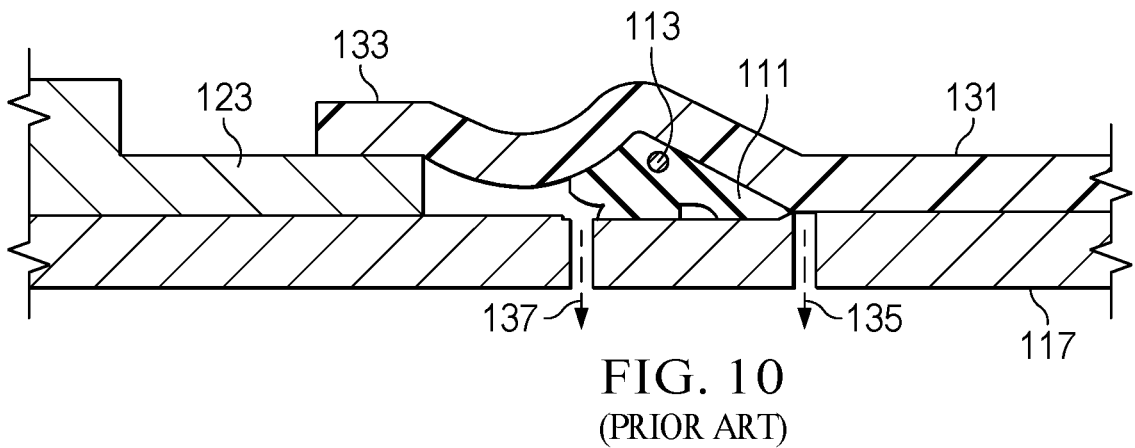
Figure 11:
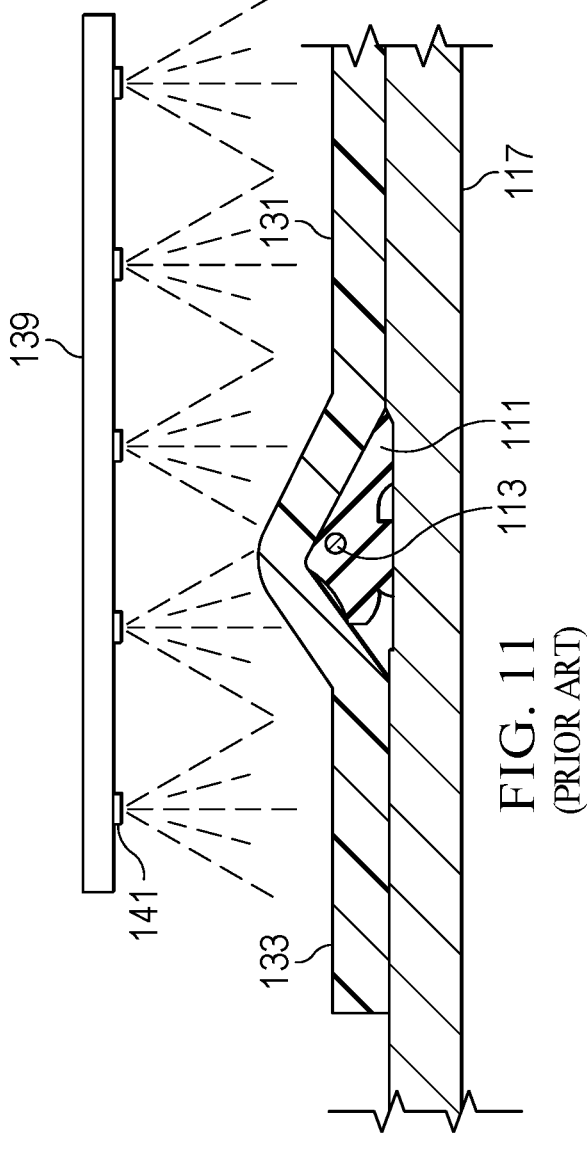

In the second step of the prior art process shown in FIG. 9, the socket end 133 of the thermoplastic pipe 131 is heated and pushed over the steel mandrel 117, gasket 111 and back-up collar 123. The socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. Typically, PVC will be used (PVC-U or PVC-O). The socket end 133 flows over the first cylindrical extent 125 of the back-up collar 123 and abuts the step region 129 in the second step of the process.

In the next step of the prior art process (FIG. 10) the mandrel and pipe move away from the back-up collar 123 and the pipe socket end 133 retracts around the mandrel and gasket 111 due to the clastic forces of the thermoplastic material. Typically, vacuum was also applied through ports 137 which connected the mandrel working surface with a vacuum source (not shown). In the final step of the prior art process shown in FIG. 11, the pipe socket end 133 is allowed to cool by any convenient means. In the particular system illustrated, the socket end 133 is cooled by means of a water spray bar 139 and spray nozzles 141. The socket end could also be allowed to air cool. As the cooling takes place, the pipe socket end 133 shrinks around the gasket 111, thus compressing the rubber body of the gasket between the steel reinforcing ring 113 and the socket-groove to establish a firm seal.

The manufacturing process used in forming the joining system of the present invention uses these same general steps, except that the special ring-shaped casing member 23 is also installed on the forming mandrel (see FIG. 8) at a second circumferential location ahead of (to the right of as viewed in FIG. 8) the sealing gasket. Then, using the same general method steps as have been described, both the sealing gasket and casing member are belled over during the belling operation.

The joining system of the invention also uses a spline or keystrap formed of a particular class or classes of materials. In the past, the keystrap was typically formed of Nylon. However, in the present joining systems, the keystrap 45 is preferably formed using another of the newer class of synthetic polymeric type materials rather than the traditional Nylon materials used in the past. The preferred materials for the keystrap are PEEK and PEEK reinforced with glass fiber or carbon fiber. For example, PEEK with 10 to 30% by weight glass fiber.

Figure 4:
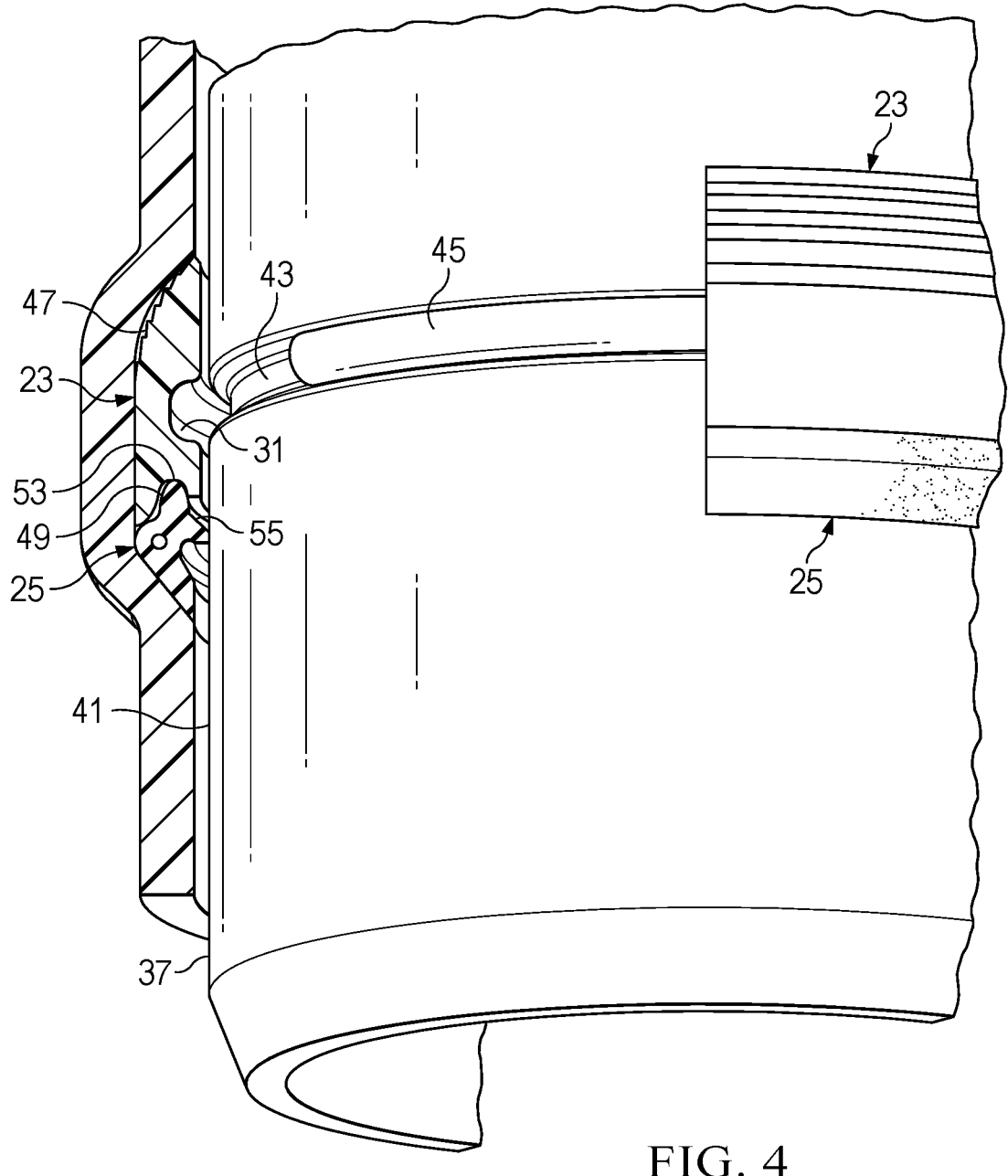
FIG. 4 is an enlarged view showing a cut away of the female belled pipe end and showing the locking key strap passing through the canal passageway to securely join the female pipe section to the male pipe section.

FIG. 4 is a quarter sectional view of the belled pipe end 11 showing the internal components of the joining system of the invention and also showing the insertion of the mating male plastic pipe end 37. The mating second section of plastic pipe 37 has an interior surface 39 and an exterior surface 41. The exterior surface 41 has at least one groove 43 formed at one circumferential location thereof which is alignable with the interior recess 21 formed in the belled pipe end 11 when the male pipe end 37 is inserted within the mouth opening 19 of the belled pipe end to form a joint. As will be appreciated from FIG. 4 and the discussion which follows, the bore 33 of the casing member 23 aligns with the bore 34 in the belled end of the first section of plastic pipe, whereby the bores, in combination with the aligned recess 21 and groove 43, form a canal type passageway for receiving a flexible keystrap 45 inserted at least partly therethrough.

As also will be appreciated from FIG. 4, the ring shaped casing member 23 has a leading edge 47 and a trailing edge 49. The trailing edge 49 is, in this case, provided with a concave shaped profile which receives a leading nose portion 53 of the sealing element 25 to further secure the sealing element within the circumferential recess 21 provided in the belled pipe end. The leading edge 47 of the casing member 23 can also be provided with a ribbed profile which engages a mating surface provided within the recess 21, in some cases.

While the sealing element can assume a number of forms, it will typically installed within the circumferential recess 21 (FIG. 1) of the belled pipe end rearwardly of the ring shaped casing member 23 and of the mouth opening 19 thereof. In the particular embodiment illustrated in FIG. 4, the elastomeric sealing gasket 25 has a downwardly extending sealing lip 55 which is contacted by the exterior surface 41 of the mating male plastic pipe 37 during the assembly of the joint. Thus, with the sealing element illustrated in FIG. 4, the outer circumferential region of the gasket forms a seal with the interior surface of the belled pipe end and the inner circumferential region forms a sealing surface for the exterior surface of the mating male pipe section.

Figure 5:
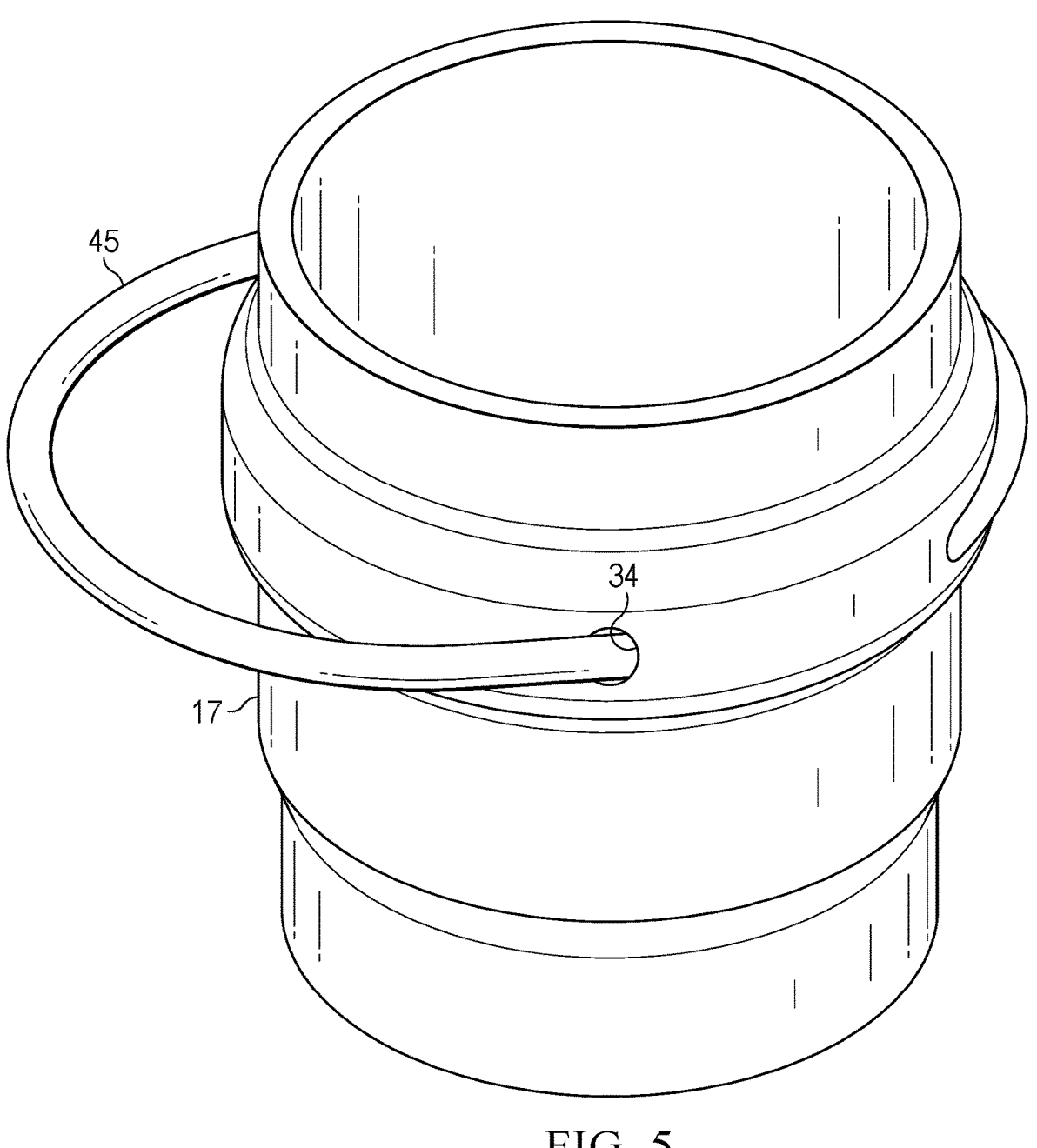
FIG. 5 is a perspective view of the female, belled pipe end showing a square shaped keystrap being inserted into the female portion of the canal passageway of the belled pipe end for illustrative purposes.

FIG. 5 is a perspective view of the female, belled pipe end 17 having the keystrap 45 inserted into the bore 34 where it passes around the machined groove 43 on the mating male pipe 37 and within the groove 31 provided on the inner circumferential surface of the casing member 23 (as has been illustrated with respect to FIG. 4). In this view, the keystrap 45 is inserted without the male pipe being inserted into the female, belled pipe end, for ease of illustration. The preferred splines are curved before being inserted into the bore. The female bore is also preferably of a curved shape, having a curvature closer to that of the spline help eliminate interference during insertion. The PEEK splines have been observed to have 36,000 lbs of pull out resistance, versus 26,000 lbs for a pure Nylon spline of the type used in the prior art.

Figure 6:
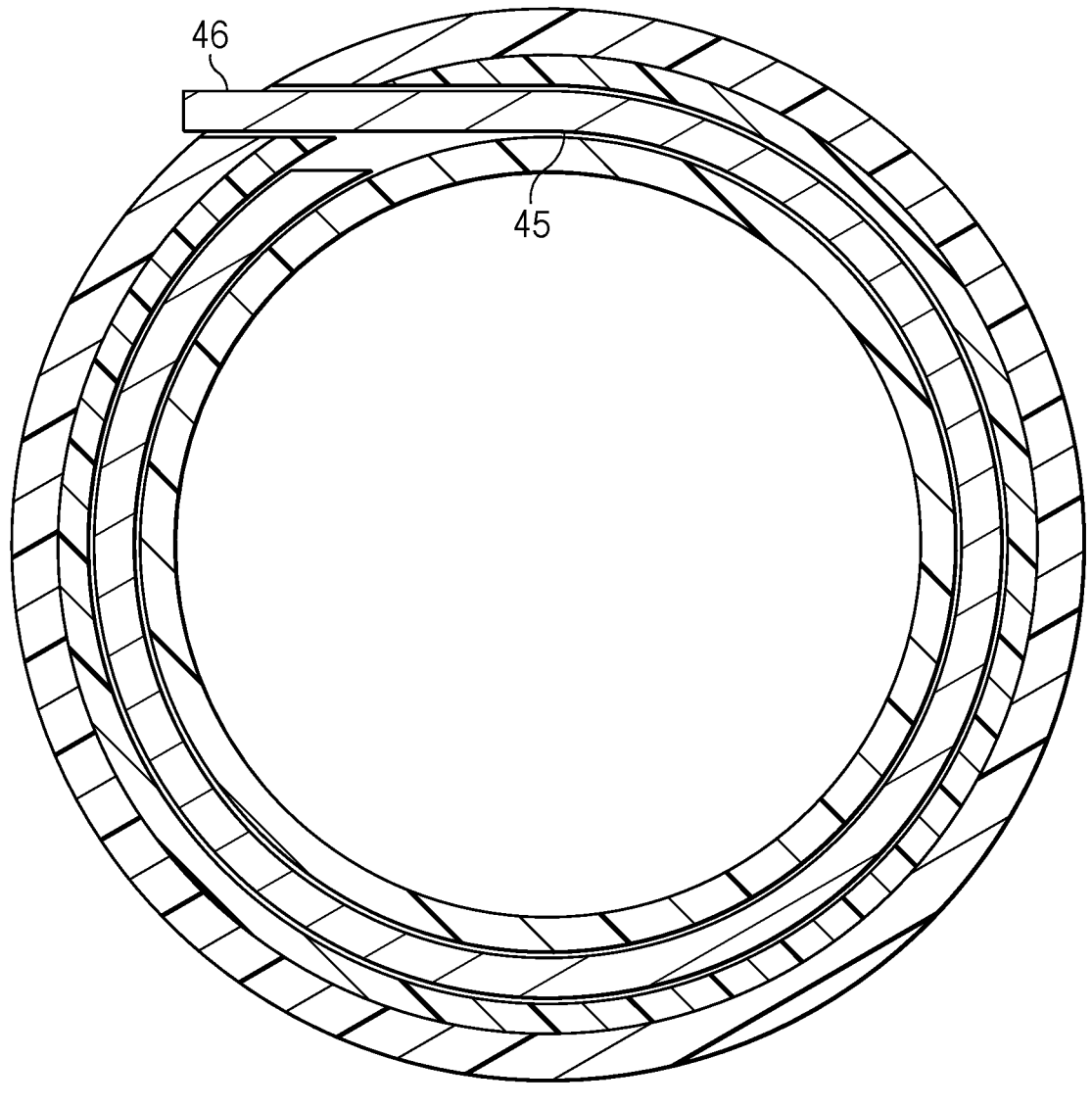
FIG. 6 is a cross sectional view showing the path of travel of the keystrap in the canal passageway of the restrained joint of the invention.

FIG. 6 shows the keystrap 45 in its circuitous path between the male and female pipe members and with the outer end or tip 46 exposed. The tip 46 is preferably tapered from a relatively larger outer diameter to a relatively smaller outer diameter. The keystrap 45 itself can assume a variety of shapes, depending upon the exact installation. It can be, for example, round or polygonally shaped, as for example square or rectangular in cross section.

A number of factors affect the performance of the materials, curvatures and hole details for the best spigot installation. In experimental work, Nylon, PEEK and PEEK+30% GF were evaluated. Splines were produced as straight, 2.0, 1.6, and 1.4 times raceway radius. A sharp hole edge was used for the bore 34 and also a 32.0 mm round at the hole edge. Previous analysis and testing show that a stiffer and stronger spline will produce greater pullout load capacity. In testing, PEEK showed unexpected improvements over Nylon, particularly when glass fiber was added as reinforcement.

However, a stiffer spline is also harder to install. In FEA simulations, the spline section used was the same in all iterations, 6.4 mm×9.5 mm. A spline curvature equivalent to 1.4 to 1.6 times the raceway radius is found to provide optimal results. This is approximately 120.0 to 140.0 mm radius. The larger radius requires more force to bend the spline around the spigot. A smaller radius wraps the spline around the outside of the joint, causes the tip of the spline to clash with the bottom of the spigot groove and requires to straighten the spline to go through the hole.

It is worth noting that, according to FEA, at a strength above approximately 250 MPa (which can be achieved with PEEK+carbon fiber) there is no significant improvement in tensile strength. Even at 180 MPa (with PEEK+Glass Fiber) there is an important improvement. Furthermore, with comparatively stiff and strong carbon steel, not only is there no gain, but there can even be a loss in performance. Among other reasons why this is true is because a spline that is too stiff will not adapt (by rotating slightly) to casing and spigot deformation. A spline made of the optimal material rotates moderately in the casing groove to remain engaged with the spigot and the casing. If the material is too soft, there is excessive rotation and the spline fails. If the material for the spline is too strong and stiff (I.e., carbon steel with yield stress above 250 MPa), it will not rotate and will not improve its engagement with the spigot, as the region around the groove deforms.

As a result of these findings, it is evident that the road to increasing tensile strength and performance is not just about making the materials in question stronger, because this would eventually exceed the strength limit imposed by the pipe. In fact, it appears from some results that if the spline is too strong and stiff, it could trigger damage on the spigot slightly earlier than the "optimal" material. The solution to the problem then is to determine what would be the strength of material that would be "just enough" to maximize tensile strength, and then to find or formulate materials in that range.

In straight splines, both elastic modulus and yield stress determine installation force. The splines will undergo plastic deformation as they bend around the spigot. Elastic modulus drives the force in elastic range, but the yield stress acts as an upper limit. In curved splines there is no plastic deformation because less bending is required to install the spline. Therefore, only the elastic modulus determines installation force.

For the FEA analysis, the pipe is modeled as PVC.

There may be only some local deformation at points of interaction with the spigot. The results are shown in Table I.

TABLE I

| Material | Elastic Modulus (MPa) | Yield Stress (MPa) |
|---|---|---|
| Nylon | 3,280 | 75 |
| PEEK | 4,050 | 104 |
| PEEK + 30% GF | 11,800 | 180 |

In further actual testing using the PEEK spline in the shape of the canal groove versus a straight Nylon spline, the following results were obtained, as shown in TABLE II:

TABLE II

| Casing Material | Spline Size | Spline Material | Failure (lbs. F) |
|---|---|---|---|
| PEEK with 13% GF | 8.7 × 6.2 mm | PEEK | 40270 |
| PVC Control | 9.3 × 6.5 mm | PEEK 12' | 39660 |
| PVC Control | 9.7 × 6.35 mm | Nylon | 27070 |

Adding a steel reinforcing ring inside the casing added about 5,000 to 7,000 pounds force to failure than the glass filled polymers alone.

Further observations from the FEA analysis: The initial stage of the installation requires the spline to straighten in order to reach the other side of the spigot and start bending around it. As curvature radius is reduced, the sharp edge of the hole interacts more strongly with the spline. A 32 mm round is found to eliminate this interaction, but the way the splines were installed they still require some straightening. Results may vary depending on the installation procedure, but this variation is expected to be small.

Since all spline radii tried are larger than the raceway radius, the splines must bend to go around the spigot. This produces a peak in assembly force. Force then drops, but it picks up again as friction against the casing grows. As the spigot continues to go in, additional regions must be straightened and then bent. The force involved remains constant and below the initial peak. In addition, since the spline is pushing back against the casing groove, there is growing friction against the casing. This causes the installation force to continue growing linearly until the installation is complete. With a straight spline, there is no initial peak to go through the hole, but afterwards there is greater force due to greater bending.

Another unexpected result discovered in FEA analysis and testing was that there is a non-linear relationship to the size of the spline and performance. There is actual a sweet spot where the 6.4×9.5 mm spline outperforms the larger and smaller splines with both a 3.0 and 3.2 m groove, which doesn't happen with the 2.8 mm grove. The use of PEEK with glass fiber, and carbon fiber, inverts the results versus Nylon and pure PEEK. With the smaller spline, and one of these two GF of CF, the results are better than with the larger splines.

An invention has been provided with several advantages. As has been noted, the use of a new class of materials for the keystrap and casing element have resulted in unexpectedly improved tensile strengths, pull-out strengths, and increased testing cycles to failure for pipe joints made with these newer class of materials. The joining system is especially well adapted for large plastic pipe sizes, e.g., 6 inches and greater. Reinforcement of the female bell end improves handling durability and provides for higher pressure rated joining systems. The addition of the ring-shaped casing also reinforces the female bell end for axial deflection forces commonly encountered in directional drilling applications.

While the invention has been shown in only one of its forms, it is not thus limited but is susceptible to various changes and modifications without departing from the spirit thereof.

What is claimed is:

1. A joining system for use in assembling a restrained joint of a first and second sections of plastic pipe, the joining system comprising:

a first section of plastic pipe having a female, belled pipe end with an end opening and having an exterior surface, an interior surface and having a circumferential recess formed in the belled pipe end adjacent the end opening on the interior surface thereof;

at least one bore communicating the exterior surface of the belled pipe end with the interior recess thereof;

a second section of plastic pipe having a mating male plastic pipe end having an interior surface and exterior surface, and wherein the exterior surface has at least one groove formed at one circumferential location thereof which is alignable with the interior recess formed in the belled pipe end when the male pipe end is inserted within the mouth opening of the belled pipe end to form a joint;

a ring-shaped casing member installed within the circumferential recess provided in the belled end of the first section of plastic pipe, the ring-shaped casing member having an inner circumferential surface and an outer circumferential surface and having at least one groove formed at one inner circumferential location on the inner circumferential surface thereof, wherein at least one bore extends from the outer circumferential surface to the groove which is provided on the inner circumferential surface thereof, and wherein the bore of the ring-shaped casing member aligns with the bore in the belled end of the first section of plastic pipe whereby the bores, in combination with the aligned recess and groove, form a canal passageway;

a flexible keystrap adapted to be inserted at least partly through the canal passageway, wherein the flexible keystrap is made of polyether ether ketone (PEEK) or PEEK reinforced with glass fiber;

an associated sealing element co-located within the circumferential recess provided in the first section of plastic pipe adjacent the ring-shaped casing member, the sealing element having an inner circumferential region and an outer circumferential region, the outer circumferential region being arranged to form a seal with the interior surface of the belled end while the inner circumferential region forms a sealing surface for the exterior surface of the mating male pipe section; and wherein the ring-shaped casing member is made of PEEK, polyethylene terephthalate (PET), or polypropylene (PP) and glass or carbon fiber reinforced versions thereof.

2. The joining system of claim 1, wherein the ring-shaped casing member and associated sealing element are both located within the female belled pipe end during manufacture of the pipe in a Rieber style manufacturing operation.

3. The joining system of claim 2, wherein the sealing element is located within the circumferential recess of the belled pipe end rearwardly of the ring-shaped casing member, the sealing element having a downwardly extending sealing lip which is contacted by the exterior surface of the mating male plastic pipe during the assembly of a pipe joint.

4. The joining system of claim 1, wherein the ring-shaped casing member is is filled with 15 to 30% by weight glass or carbon fiber.

5. The joining system of claim 1, wherein the keystrap has a curvature equivalent to 1.4 to 1.6 times the radius of the canal passageway.

6. A joining system for use in assembling a restrained joint of a first and second sections of plastic pipe, the joining system comprising:

a first section of plastic pipe having a female, belled pipe end with an end opening, an exterior surface, an interior surface, and having a heat and expansion formed interior circumferential recess formed in the belled pipe end adjacent the end opening on the interior surface thereof;

at least one bore communicating the exterior surface of the belled pipe end with the interior circumferential recess thereof;

a second section of plastic pipe having a mating male plastic pipe end having an interior surface and exterior surface, and wherein the exterior surface has at least one groove formed at one circumferential location thereof which is alignable with the interior circumferential recess formed in the belled pipe end when the male pipe end is inserted within the mouth opening of the belled pipe end to form a joint;

a ring-shaped casing member installed within the heat and expansion formed interior circumferential recess provided in the belled end of the first section of plastic pipe, the ring-shaped casing member having an inner circumferential surface and an outer circumferential surface and having at least one groove formed at one inner circumferential location of the inner circumferential surface thereof, wherein at least one bore extends from the outer circumferential surface to the groove which is provided on the inner circumferential surface thereof, and wherein the ring-shaped casing member is positionable so that the bore of the ring-shaped casing member aligns with the bore in the belled end of the first section of plastic pipe, whereby the bores, the at least one groove of the ring-shaped casing member, and the at least one groove of the second section of the plastic pipe form a canal passageway;

a flexible keystrap adapted to be inserted at least partly through the canal passageway when the first and second plastic pipes are joined, wherein the flexible keystrap is made of polyether ether ketone (PEEK) or PEEK reinforced with glass fiber a ring-shaped elastomeric sealing element installed within the same heat and expansion formed interior, circumferential recess provided in the first section of plastic pipe as the ring-shaped casing member and in contact with the ring-shaped casing member, the sealing element having an inner circumferential region and an outer circumferential region, the sealing the outer circumferential region forming a seal with the interior surface of the belled end of the first pipe and the inner circumferential region forming a seal with the exterior surface of the mating male pipe section when the male pipe end is inserted within the opening of the belled pipe end, the sealing element being installed within the circumferential recess of the belled pipe end rearwardly of the ring-shaped casing member and of the end opening of the bell pipe end;

wherein the ring-shaped casing member has a leading edge and a trailing edge, the trailing edge being provided with a recessed profile which mates with and engages a leading nose portion of the sealing element so that while the sealing element and the ring-shaped casing member are separate elements, the sealing element and the ring-shaped casing member are interengaged with the leading nose portion of the sealing element extending into the recessed profile of the ring-shaped casing member, the interengagement to secure the sealing element within the interior of the circumferential recess; and wherein the ring-shaped casing member is made of PEEK, polyethylene terephthalate (PET), or polypropylene (PP) and glass or carbon fiber reinforced versions thereof.

7. The joining system of claim 6, the sealing element having a downwardly extending sealing lip which is contacted by the exterior surface of the mating male plastic pipe to form a lip seal during the assembly of the coupling.

8. The joining system of claim 6, wherein the ring-shaped casing member is filled with 15 to 30% by weight glass or carbon fiber.

9. The joining system of claim 6, wherein the keystrap has a curvature equivalent to 1.4 to 1.6 times the radius of the canal passageway.

* * * * *